United States Patent
Kaneko (10) Patent No.: US 10,565,780 B2
(45) Date of Patent: Feb. 18, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Chiaki Kaneko, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/818,560

(22) Filed: Nov. 20, 2017

(65) Prior Publication Data
US 2018/0150995 A1 May 31, 2018

(30) Foreign Application Priority Data

Nov. 28, 2016 (JP) .................................. 2016-229694
Aug. 31, 2017 (JP) .................................. 2017-167752

(51) Int. Cl.
*G06T 15/50* (2011.01)
*G06T 17/20* (2006.01)

(52) U.S. Cl.
CPC ............ *G06T 15/506* (2013.01); *G06T 17/20* (2013.01); *G06T 2215/16* (2013.01)

(58) Field of Classification Search
None
See application file for complete search history.

(56) References Cited

U.S. PATENT DOCUMENTS

| 9,769,392 B1* | 9/2017 | Colburn | H04N 5/23222 |
| 2004/0057051 A1* | 3/2004 | Burkatovsky | G01N 21/55 356/445 |
| 2007/0053607 A1* | 3/2007 | Mitsunaga | H04N 5/20 382/274 |
| 2012/0020081 A1* | 1/2012 | Goto | G02B 3/005 362/235 |
| 2012/0081386 A1* | 4/2012 | Wiemker | G06T 7/0012 345/589 |
| 2015/0178592 A1* | 6/2015 | Ratcliff | H04N 5/23222 382/155 |

(Continued)

FOREIGN PATENT DOCUMENTS

JP H06-111028 A 4/1994

*Primary Examiner* — Saptarshi Mazumder
(74) *Attorney, Agent, or Firm* — Canon USA, Inc., IP Division (57) ABSTRACT

An image processing apparatus includes: a first acquiring unit configured to acquire shape information indicating a shape of a surface of an object, and reflection characteristic information indicating a reflection characteristic of the object; a second acquiring unit configured to acquire viewpoint information about a viewpoint of viewing the object, and light source information about a light source applying light to the object; an emphasizing unit configured to emphasize a light reflection intensity of the object so as to increase a degree of emphasis as a degree of flatness of the shape increases in image data representing the object, based on the reflection characteristic information, the viewpoint information, the light source information, and the shape information; and an output unit configured to output the image data representing the object having the light reflection intensity is emphasized by the emphasizing unit.

18 Claims, 8 Drawing Sheets

(56) References Cited

U.S. PATENT DOCUMENTS

2015/0276591 A1* 10/2015 Kubo .................... G06T 11/001
  345/619
2016/0050409 A1* 2/2016 Park ................... G02B 27/2214
  348/54

* cited by examiner

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, a storage medium, and a technique for image processing on a gloss of an object in an image.

Description of the Related Art

A technique for adding a gloss to an object in an image has been heretofore known. Japanese Patent Laid-Open No. H06-111028 discloses a technique for adding a highlight to an arbitrary position on an object to be rendered by setting a light source position in such a manner that specular reflected light is directed toward a viewpoint in three-dimensional computer graphics (3DCG). In this technique, an arbitrary range of an object is designated and a light source position is set in such a manner that reflected light beams in the range uniformly become specular reflected light, thereby adding a highlight.

Meanwhile, a technique for reproducing a shape of fine unevenness on an object surface by CG or the like has been in widespread use. In an object having a shape of fine unevenness on a surface thereof, a normal line direction of a reflection plane finely changes depending on a change in the shape of unevenness, unlike in an object with a smooth surface. A fine change in the normal line direction causes a fine fluctuation in a specular reflection direction of light, and further in the intensity of reflected light observed from a viewpoint position. This fluctuation appears as a texture unique to the object. For example, it is known that the texture as mentioned above appears in a metallic material including small metallic flakes, a material subjected to satin finish processing, or the like.

If a highlight is added to an object to reproduce the texture of a metallic material or the like as mentioned above by using the technique disclosed in Japanese Patent Laid-Open No. H06-111028, the reflected light beams in the highlight portion uniformly become the specular reflected light as described above. Accordingly, a fine fluctuation in the intensity of the reflected light is not caused in the highlight portion. This causes a problem that the texture unique to the object in the highlight portion is impaired.

SUMMARY

The present disclosure has been made to address these topics, and one or more aspects of the present disclosure provide processing for emphasizing a gloss of an object in consideration of a shape of an object surface.

To address one or more of these topics, an image processing apparatus according to one or more aspects of the present disclosure includes: a first acquiring unit configured to acquire shape information indicating a shape of a surface of an object, and reflection characteristic information indicating a reflection characteristic of the object; a second acquiring unit configured to acquire viewpoint information about a viewpoint of viewing the object, and light source information about a light source applying light to the object; an emphasizing unit configured to emphasize a light reflection intensity of the object so as to increase a degree of emphasis as a degree of flatness of the shape increases in image data representing the object, based on the reflection characteristic information, the viewpoint information, the light source information, and the shape information; and an output unit configured to output the image data representing the object having the light reflection intensity is emphasized by the emphasizing unit.

Further features of the present disclosure will become apparent from the following description of exemplary embodiments (with reference to the attached drawings).

DESCRIPTION OF THE EMBODIMENTS

Exemplary embodiments of one or more aspects of the present disclosure will be described below with reference to the drawings.

In a first exemplary embodiment, processing for changing a degree of emphasis for emphasizing a gloss according to a feature of a shape of an object surface to be rendered. This processing will be described in detail below.

Figure 1:
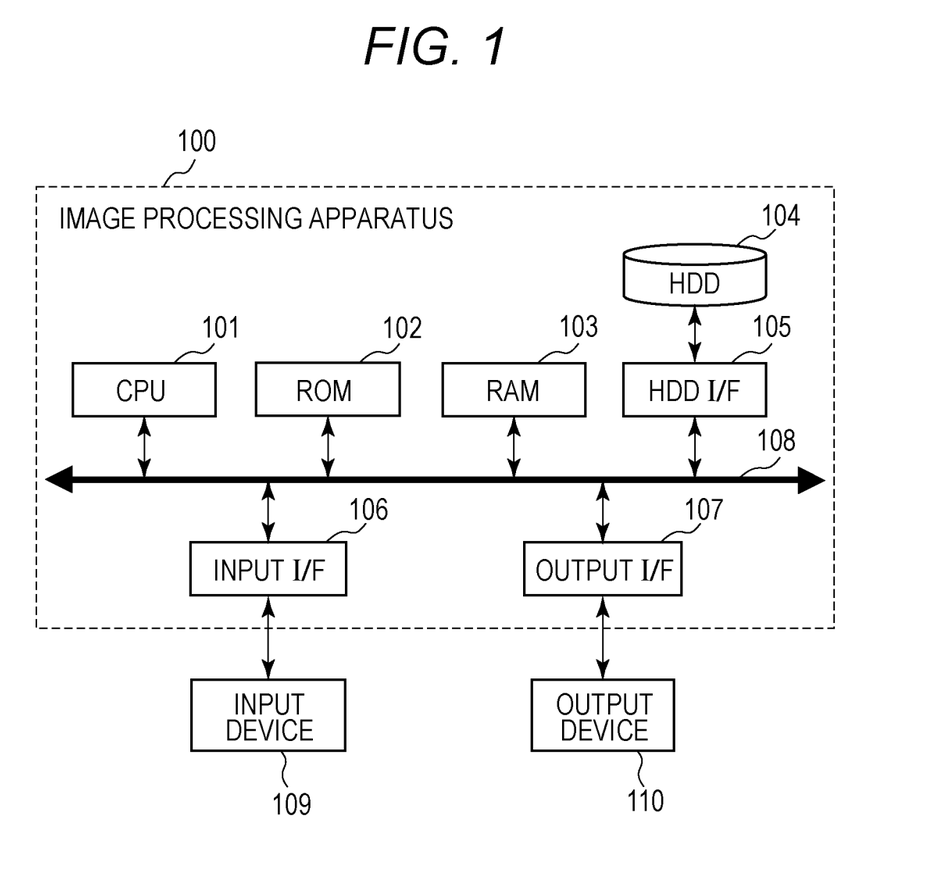
FIG. 1 is a diagram illustrating a hardware configuration of an image processing apparatus 100 according to one or more aspects of the present disclosure.

FIG. 1 is a diagram illustrating a hardware configuration example of an image processing apparatus 100. The image processing apparatus 100 includes a central processing unit (CPU) 101, read-only memory (ROM) 102, random access memory (RAM) 103, a hardware disk drive (HDD) 104, an HDD interface (I/F) 105, an input I/F 106, an output I/F 107, and a system bus 108. The CPU 101, which may include one or more processors and one or more memories, executes programs stored in the ROM 102 and the HDD 104 by using the RAM 103 as a work memory, controls each unit, which is described below, via the system bus 108. The HDD I/F 105 is an interface, such as serial advanced technology attachment (SATA), which connects a secondary storage device such as the HDD 104 or an optical disk drive. The CPU 101 can read out data from the HDD 104 through the HDD I/F 105, and can write the data into the HDD 104.

Further, the CPU 101 develops the data stored in the HDD 104 in the RAM 103. Similarly, the data developed in the RAM 103 can be stored in the HDD 104. Further, the CPU 101 can recognize the data developed in the RAM 103 as a program and execute the program. The input I/F 106 is a serial bus interface, such as a universal serial bus (USB), which connects an input device 109, such as a keyboard, a mouse, or a 3D scanner. The CPU 101 can read various data from the input device 109 through the input I/F 106. The output I/F 107 is a serial bus interface, such as a USB or IEEE, which connects an output device 110 to a monitor, a printer, or the like. The CPU 101 can transmit data to the output device 110 through the output I/F 107 and cause the output device to execute display or recording. Note that the input I/F 106 and the output I/F 107 may be combined into one I/F by using a bidirectional communication interface such as a USB or IEEE.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 2:
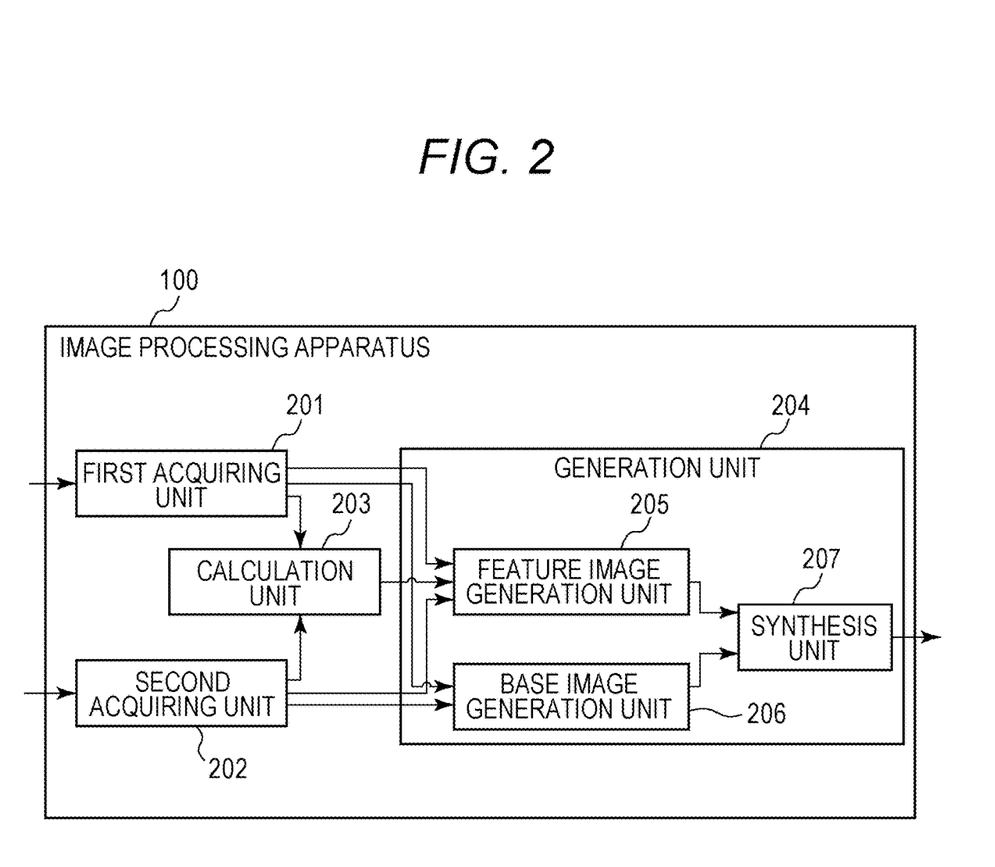
FIG. 2 is a block diagram illustrating a functional configuration of the image processing apparatus 100 according to one or more aspects of the present disclosure.

FIG. 2 is a block diagram illustrating a functional configuration of the image processing apparatus 100. The image processing apparatus 100 includes a first acquiring unit 201, a second acquiring unit 202, a calculation unit 203, and a generation unit 204.

The first acquiring unit 201 acquires object data, which is composed of shape information and reflection characteristic information about an object, from the input device 109 and a database which is not illustrated. In this case, the shape information is data representing the shape of the object surface. In the present embodiment, mesh data is used as the shape information. The mesh data is data for displaying a mesh model representing the shape of an object by a set of plate-like elements having a plurality of sides. For example, the mesh data includes coordinate data on each vertex of a triangle disposed in a three-dimensional space and a normal line vector. Note that the data format of the shape information is not particularly limited, as long as the position and shape of the object can be specified. For example, the shape information may be a parametric model represented by a NURBS (Non-Uniform Rational B-Spline) curved surface or the like. The reflection characteristic information is data representing the reflection characteristic of the object. The reflection characteristic information according to the present embodiment indicates a diffuse reflection coefficient kd, an ambient light reflection coefficient ka, a specular reflection coefficient ks, and a specular reflection index n in a Phong specular reflection model as expressed by the following formulae (1) to (5).

$$I = I_{Dr} + I_{Ar} + I_{Sr} \quad \text{Formula (1)}$$

$$I_{Dr} = I_{Di} \times k_d \times (N \cdot L) \quad \text{Formula (2)}$$

$$I_{Ar} = I_{Ai} + k_a \quad \text{Formula (3)}$$

$$I_{Sr} = I_{Si} \times k_s \times (L \cdot R)^n \quad \text{Formula (4)}$$

$$R = -E + 2(N \cdot E)N \quad \text{Formula (5)}$$

where I represents an intensity of reflected light with respect to ambient light and incident light that is incident on the object and output from a light source; $I_{Dr}$ represents a diffuse reflection component of the intensity I (diffuse-reflected light intensity); $I_{Ar}$ represents an ambient light component of the intensity I (intensity of reflected light with respect to the ambient light incident on the object); $I_{Sr}$ is a specular reflection component of the intensity I (specular reflected light intensity); R is a reflection vector; $I_{Di}$ is an intensity of incident light from the light source that contributes a diffuse reflection in the object; $I_{Ai}$ represents an intensity of ambient light incident on the object; $I_{Si}$ represents an intensity of incident light from the light source that contributes to a specular reflection in the object; and N, L, and E represent a normal line vector, a light source vector, and a line-of-sight vector, respectively. Note that other reflection model parameters, such as a Blinn-Phong specular reflection model or the like, may be used as the reflection characteristic information. The acquired object data is transmitted to the calculation unit 203 and the generation unit 204.

The second acquiring unit 202 acquires a rendering parameter used for rendering the object according to a user instruction through the input I/F 106. The rendering parameter includes the viewpoint information and the light source information. Note that the rendering parameter stored in a storage device, such as the HDD 104, may be acquired. The viewpoint information indicates a position of the viewpoint, a line-of-sight direction from the viewpoint, and a range (angle of view) viewed from the viewpoint. The light source information indicates a position of the light source, a direction (ray direction) of light traveling from the light source, and an intensity of light emitted from the light source. The acquired rendering parameter is transmitted to the calculation unit 203 and the generation unit 204.

The calculation unit 203 calculates the shape feature value representing the feature of the shape of the object surface based on the object data and the rendering parameter. This process is described in detail below. The calculated shape feature value is transmitted to the generation unit 204.

Figure 9A:
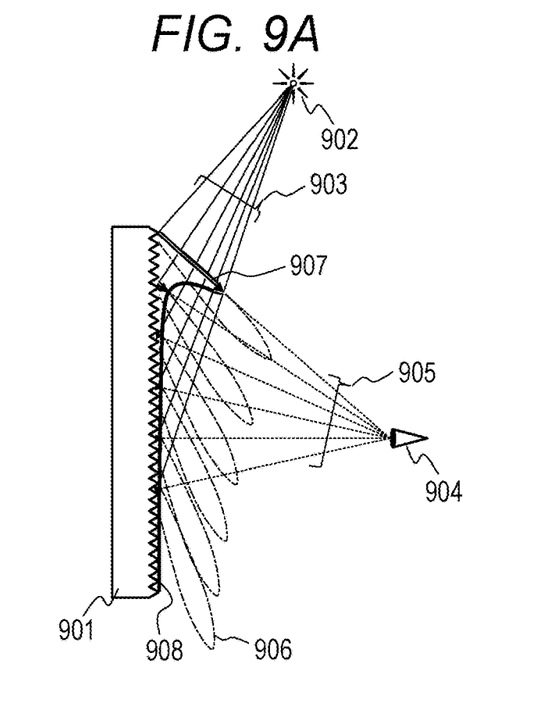
FIGS. 9A and 9B are diagrams each illustrating an example of reflection according to one or more aspects of the present disclosure.
Figure 9B:
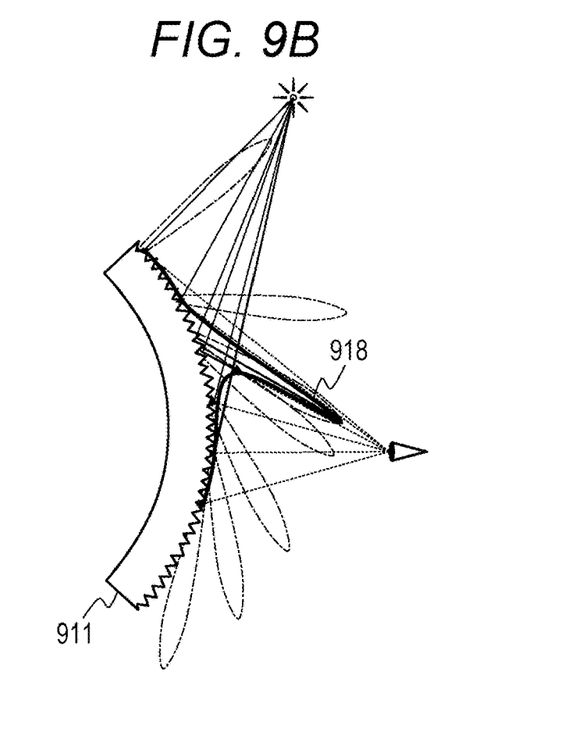

The generation unit 204 includes a feature image generation unit 205, a base image generation unit 206, and a synthesis unit 207. The generation unit 204 generates and outputs an output image representing the object having a gloss that is emphasized according to the shape feature value. One of the factors that provide the texture of the object is a variation in reflection intensity based on a spatial distribution of normal line directions on a reflection plane. In the present embodiment, assume that a Phong specular reflection model, which is a reflection model that is generally and widely used, and a specular reflection component (gloss) in which a change in normal line direction greatly contributes to the intensity is emphasized. Thus, the output image in which the texture of the object is emphasized is generated. Further, in a planar portion which is flatter than a curved surface portion having unevenness in which a variation in an angle formed between a light incidence direction and a line-of-sight direction with respect to a reflection plane between vicinity meshes is gentle, a fluctuation range of the intensity of reflected light is small, which makes it difficult to find the texture of the object. Accordingly, in the present embodiment, the degree of emphasis of the gloss is increased as the shape of the object becomes closer to a planar surface. FIGS. 9A and 9B illustrate an example of reflection. An object 901 illustrated in FIG. 9A represents a flat-plate-shape object having fine unevenness on the surface thereof. An object 911 illustrated in FIG. 9B represents a curved object having fine unevenness on the surface thereof. When light is irradiated from a light source 902, rays 903 are each reflected at a point on the object 901. The reflected rays 905 are incident on a viewpoint 904. Dashed-dotted lines 906 schematically represent a specular reflection when light from the rays 903 from the light source direction is incident on a small region including fine unevenness on the object 901. In general, the specular reflection indicates reflection of light in one direction in which the angle of incidence of the light and the reflection angle of the light are the same with respect to a reflection plane. However, considering a small region including fine unevenness on the object surface, the specular reflection in the small region appears to be generated in various directions depending on the normal line of fine unevenness. Specifically, the specular reflection direction appears to expand, and this expansion appears as a texture. In a typical metallic material, the intensity of reflected light traveling in the specular reflection direction when an approximately planar surface of the small region is set as a reflection plane is highest. Accordingly, when the specular reflection direction of the approximately planar surface and the line-of-sight direction are different, the intensity of the observed specular reflected light is relatively low. A curve 908 illustrated in FIG. 9A schematically represents the intensity of the specular reflection component in the line-of-sight direction from each point on the object 901. In the example illustrated in FIG. 9A, there is no reflection point at which the specular reflection direction of the approximately planar surface and the line-of-sight direction match on the object 901, and a maximum intensity of reflected light observed at a viewpoint position decreases. On the other hand, a curve 918 illustrated in FIG. 9B represents the intensity of the specular reflection component in the line-of-sight direction from each point on the curved object 911. In general, the viewpoint and light source position conditions obtained by the specular reflected light on a certain plane are limited to a narrow range based on the normal line direction of the plane. Accordingly, in the object closer to a planar surface in which the normal line direction is set in a constant direction, it is more difficult to obtain the specular reflection with a higher intensity, than in the curved object in which the normal line direction is set in various directions, so that it is difficult to distinguish the texture of the object.

Each unit constituting the generation unit 204 will be described below. Note that processing in each unit will be described in detail below.

The feature image generation unit 205 calculates a specular reflection component on the object of incident light incident from the light source. Further, the feature image generation unit 205 generates feature image data by performing emphasizing processing according to the shape feature value on the specular reflection component. The generated feature image data is transmitted to the synthesis unit 207.

The base image generation unit 206 generates base image data by obtaining the diffuse reflection component in the object of incident light incident from the light source and the intensity of reflected light from the ambient light on the object. The generated base image data is transmitted to the synthesis unit 207.

The synthesis unit 207 generates output image data by synthesizing the feature image data and the base image data.
<Processing Executed by the Image Processing Apparatus 100>

Figure 3:
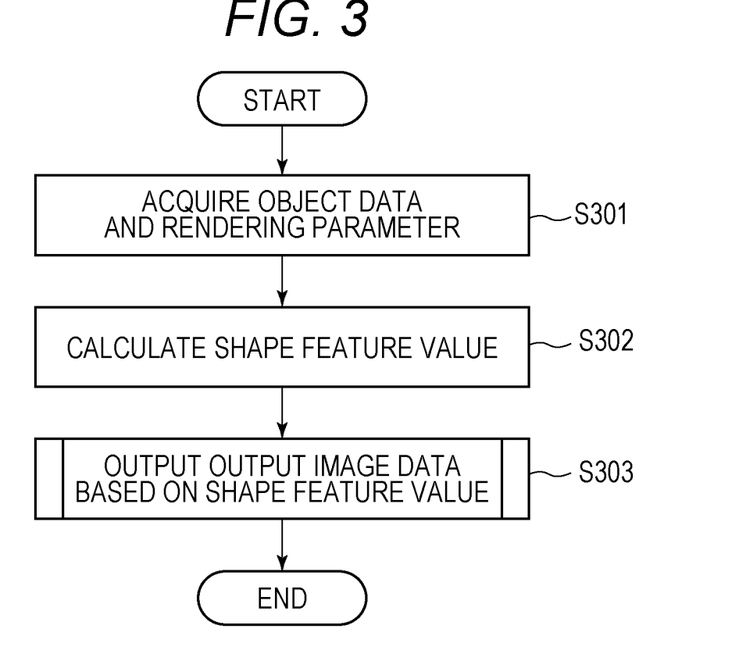
FIG. 3 is a flowchart illustrating a flow of a series of processes in the image processing apparatus 100 according to one or more aspects of the present disclosure.

FIG. 3 is a flowchart illustrating an operation procedure of a series of processes in the image processing apparatus 100.

The series of processes are implemented in such a manner that the CPU 101 executes a computer-executable program describing the following procedure after reading the program from the ROM 102 or the HDD 104 into the RAM 103. Each step is represented by "S" which is added before each reference numeral.

In step S301, the first acquiring unit 201 acquires object data, and the second acquiring unit 202 acquires rendering parameter. In step S302, the calculation unit 203 calculates the shape feature value based on the object data and the rendering parameter acquired in step S301. In the present embodiment, a plane constituting a schematic shape of an object are calculated based on normal lines of the object surface. Further, the calculation unit 203 calculates, as the shape feature value, a degree of dispersion of the normal line direction within each plane. The plane constituting a schematic shape of an object described herein refers to a set of a series of adjacent meshes having similar normal line vectors when the object is viewed in a broad sense (i.e., when fine unevenness on the surface are neglected). Processing for calculating the shape feature value will be described in detail below.

First, a normal line image is generated by recording, as a pixel value, a normal line vector included in the angle of view of rendering of the meshes constituting the object based on the object data and the rendering parameter. In the present embodiment, vertex coordinates (x, y, z) of the mesh in a three-dimensional space is converted into a pixel position (i, j) on a two-dimensional image by Formula (6) which is a typical projection transformation. A normal line vector (nx, ny, nz) corresponding to the vertex is recorded as a pixel value N(i, j) of a pixel (i, j).

$$\begin{pmatrix} i \\ j \\ 1 \end{pmatrix} = M_S M_P M_V \begin{pmatrix} x \\ y \\ z \\ 1 \end{pmatrix} \quad \text{Formula (6)}$$

$M_S$, $M_P$, and $M_V$ represent a screen transformation matrix, a projective transformation matrix, and a view transformation matrix, respectively, which are determined from the rendering parameter. As for a pixel corresponding to the inside of the mesh, a value interpolated from a normal line vector corresponding to each vertex constituting the mesh is stored. Publicly-known rendering processing in computer graphics can be used to generate the normal line image (two-dimensional image in which a pixel value N(i, j) is recorded in each pixel) as described above, and thus detailed descriptions thereof are omitted.

Next, a smoothing normal line image is generated by removing a fluctuation in the normal line due to fine unevenness by performing smoothing processing on the generated normal line image, and region division is performed on the smoothing normal line image. A publicly-known Gaussian filter is used for smoothing. A pixel value of the smoothing normal line image is represented by N'(i, j). A moving average filter, a median filter, or the like, may be used for smoothing. Publicly-known region growing may be used for region division. Note that other publicly-known techniques such as threshold processing based on a histogram may be used. In the regions obtained by region division, the normal line vectors face in a substantially similar direction. In other words, each region can be regarded as a plane constituting the schematic shape of the object.

Figure 5A:
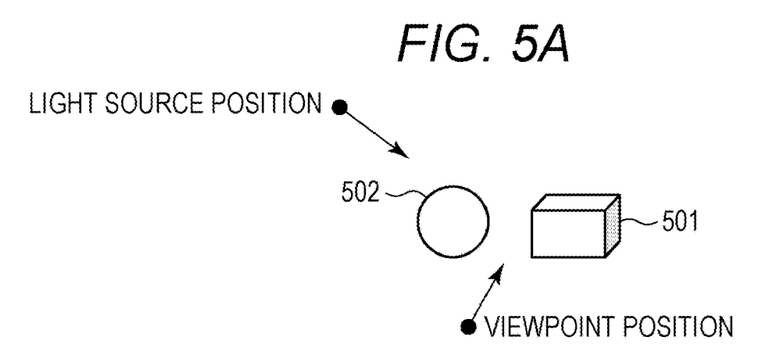
FIGS. 5A, 5B, and 5C are diagrams each illustrating a shape feature value according to one or more aspects of the present disclosure.
Figure 5B:
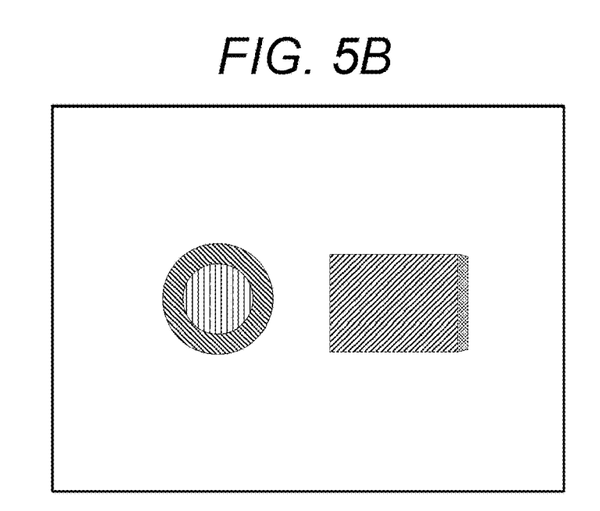
Figure 5C:
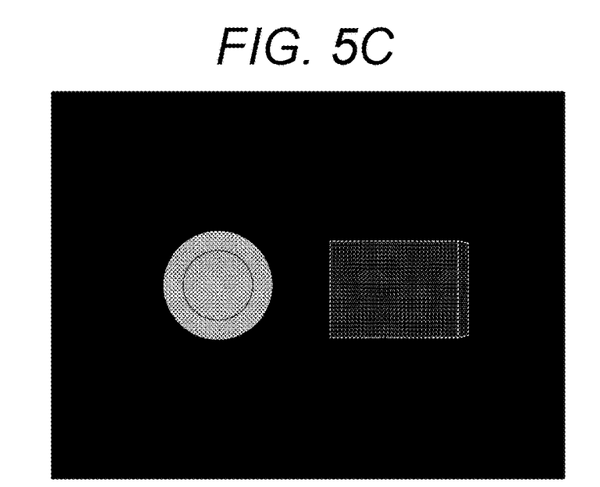

Next, a shape feature value F(i, j) is calculated in accordance with Formula (7) and Formula (8) for each pixel (i, j) of the smoothing normal line image.

$$F(i, j) = \frac{\sum_{(i',j') \in R_k} \theta(i', j')^2}{num(R_k)} - \left\{\frac{\sum_{(i',j') \in R_k} \theta(i', j')}{num(R_k)}\right\}^2 \quad \text{Formula (7)}$$

$$\theta(i, j) = \cos^{-1}\left(\frac{N'(i, j) \cdot N_o}{|N'(i, j)||N_o|}\right) \quad \text{Formula (8)}$$

where Rk represents a region including the pixel (i, j) among the regions obtained by region division; num(Rk) represents the number of pixels in the region Rk; and θ(i, j) represents an angle formed between the normal line vector N'(i, j) obtained after smoothing and a predetermined reference vector NO (e.g., (1, 0, 0)). The element (i', j')∈Rk represents a position of an arbitrary pixel in a set of pixels included in the region Rk. More specifically, $\Sigma_{(i',j') \in R_k} \theta(i', j')^2$ means a total of squares of θ(i', j') which are obtained for pixel positions of pixels each included in the region Rk. Further, $\Sigma_{(i',j') \in R_k} \theta(i', j')$ means a total of θ(i', j') which are obtained for pixel positions of pixels each included in the region Rk. Accordingly, a shape feature value F(i, j) in Formula (7) corresponds to a dispersion of the direction of the normal line vector N'(i, j) obtained after smoothing in the region Rk including the pixel (i, j). In the shape feature value F(i, j), as the surface of the object corresponding to the region to which the pixel (i, j) belongs is closer to a planar shape, the value of the pixel approaches zero. As for the object illustrated in FIG. 5A, FIG. 5B illustrates the normal line image obtained by region division. FIG. 5C illustrates the shape feature value as brightness. In the example illustrated in this figure, the shape feature value of a rectangular parallelepiped 501 having a flat surface is small, and the shape feature value of a sphere 502 having a curved surface is large. The shape feature value F(i, j) can be calculated for each pixel of the normal line image by the processing described above.

Figure 4:
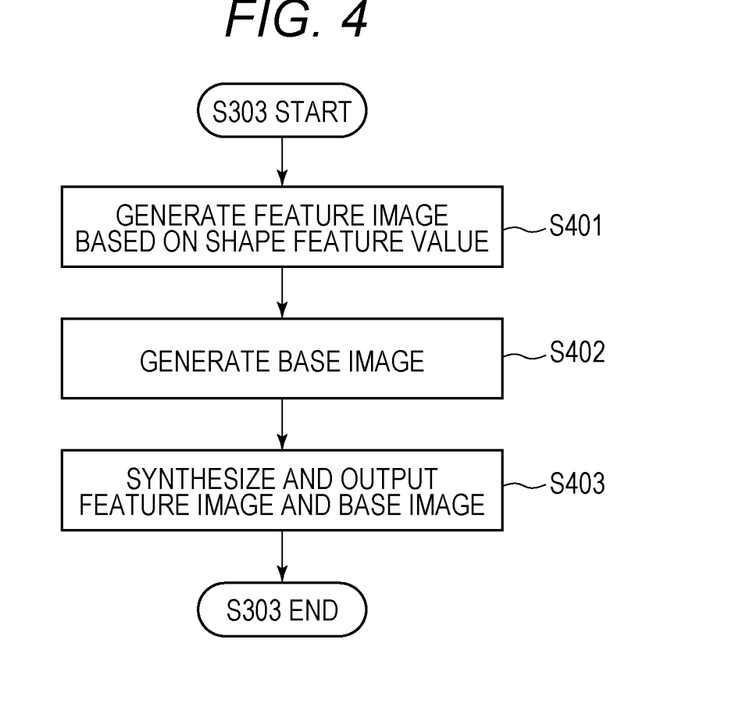
FIG. 4 is a flowchart illustrating a flow of a processing a generation unit 204 according to one or more aspects of the present disclosure.

In step S303, the generation unit 204 generates the output image by using the object data and rendering parameter acquired in step S301 and the shape feature value calculated in step S302. In the present embodiment, the output image is generated in which the specular reflection component of reflected light is regarded as a characteristic reflection component in the texture of the object and the specular reflection component is emphasized in a portion where the shape of the object is closer to a planar surface. FIG. 4 is a flowchart illustrating details of the process (S303) for generating the output image.

Figure 6A:
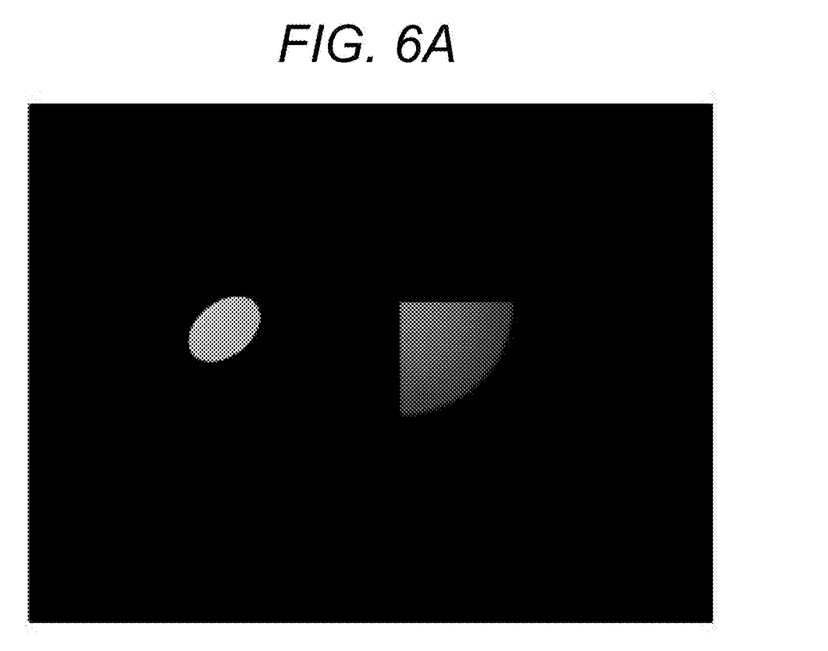
FIGS. 6A and 6B are diagrams each illustrating an example of a feature image according to one or more aspects of the present disclosure.
Figure 6B:
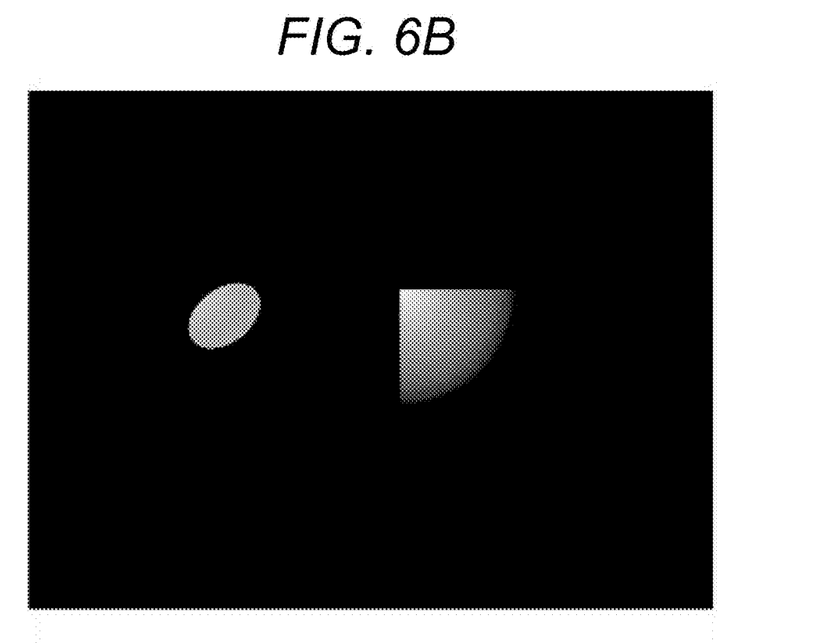

In step S401, the feature image generation unit 205 gives a normal line vector N(i, j) obtained before smoothing to Formula (4) and Formula (5), and calculates a specular reflection component $I_{Sr}(i, j)$ corresponding to each pixel (i, j) of the normal line image. Further, the specular reflection component corresponding to each pixel (i, j) of the normal line image is emphasized in accordance with Formula (9) using the shape feature value F(i, j) calculated in step S302.

$$I'_{Sr}(i,j) = I_{Sr}(i,j) \times F_{Emphasize}(i,j) \quad \text{Formula (9)}$$

$$F_{Emphasize}(i,j) = \alpha \times F_{Flat}(i,j) + 1 \quad \text{Formula (10)}$$

$$F_{Flat}(i,j) = 1/(1 + F(i,j)) \quad \text{Formula (11)}$$

where $F_{Emphasize}$ (i, j) in Formula (10) represents a degree of emphasis corresponding to the pixel (i, j); $F_{Flat}$ (i, j) in Formula (11) represents a degree of flatness in the pixel (i, j); and α(>0) represents a parameter for defining the upper limit of the height of the degree of emphasis. The parameter α may be acquired according to a user instruction through the input I/F 106, or a predetermined constant may be used. A specular reflection component $I'_{Sr}(i, j)$ obtained by Formula (9) becomes larger than the original specular reflection component $I_{Sr}(i, j)$ as the shape feature value becomes smaller (surface shape is closer to a planar surface). Further, in Formula (9), the degree of emphasis is multiplied by the specular reflection component calculated using the normal line vector N obtained before smoothing. Accordingly, a fluctuation in the reflection intensity based on the spatial distribution of normal line directions is also emphasized. FIGS. 6A and 6B illustrate examples of the specular reflection component obtained before emphasis and the specular reflection component obtained after emphasis, respectively. The specular reflection component of the rectangular parallelepiped 501 is emphasized more than that of the sphere 502. The emphasized specular reflection component $I'_{Sr}(i, j)$ thus obtained is recorded on each pixel as the pixel value of the feature image and transmitted to the synthesis unit 207. In the present embodiment, the shape feature value is calculated for each region in step S302, and thus the degree of emphasis can be increased in a planar portion of an object having a small number of sharp edges and a planar surface in a most part thereof (e.g., a step-like object), regardless of a change in the normal line direction of the edge portion. Note that the specular reflection component may be emphasized after the shape feature value F(i, j), the degree of flatness, or the degree of emphasis is smoothed between vicinity regions so as to prevent generation of an unnatural image due to a rapid change in the degree of emphasis between the regions divided in step S302. In the same manner as described above, publicly-known filter processing is used for smoothing processing.

In step S402, the base image generation unit 206 calculates $I_{Dr}$ by Formula (2), and calculates $I_{Ar}$ by Formula (3). The normal line vector N(i, j) obtained before smoothing is used as N in Formula (2). Further, a reflection component $I_{DAr}(i, j)$ other than the specular reflection component corresponding to each pixel (i, j) of the feature image generated in step S401 is calculated in accordance with Formula (12). The reflection component other than the specular reflection component is the sum of the intensity of the diffuse reflection component and the intensity of the ambient light component.

$$I_{DAr}(i,j) = I_{Dr}(i,j) + I_{Ar}(i,j) \quad \text{Formula (12)}$$

Figure 7:
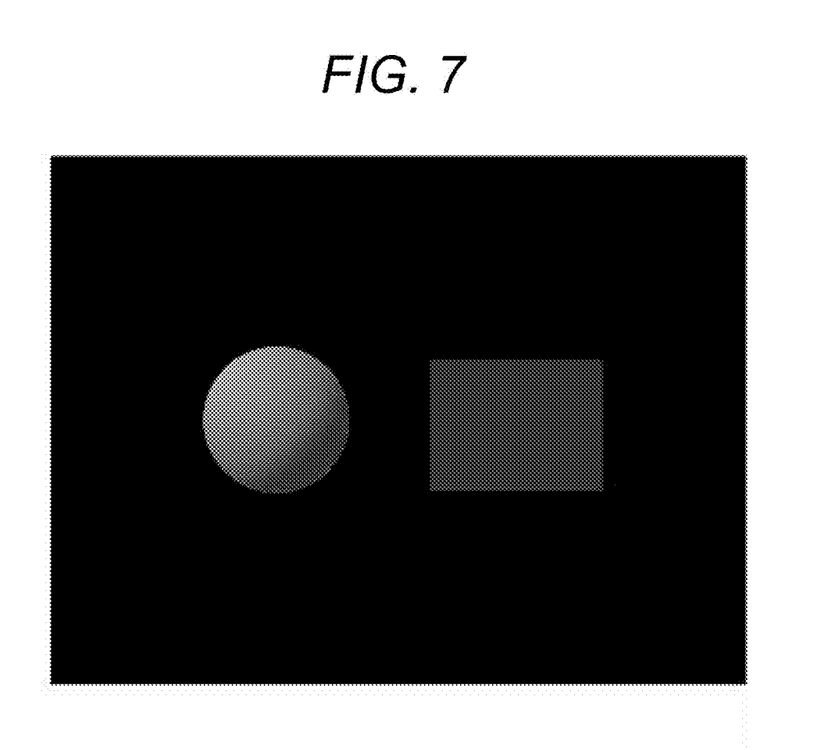
FIG. 7 is a diagram illustrating an example of a base image according to one or more aspects of the present disclosure.

FIG. 7 illustrates an example of the reflection component other than the specular reflection component. The reflection component $I_{DAr}(i, j)$ other than the obtained specular reflection component is recorded on each pixel as the pixel value of the base image and transmitted to the synthesis unit 207.

In step S403, the synthesis unit 207 synthesizes the feature image generated in step S401 and the base image generated in S402 in accordance with Formula (13), and uses the synthesized image as the output image.

$$I'(i,j) = I'_{Sr}(i,j) + I_{DAr}(i,j) \quad \text{Formula (13)}$$

Figure 8A:
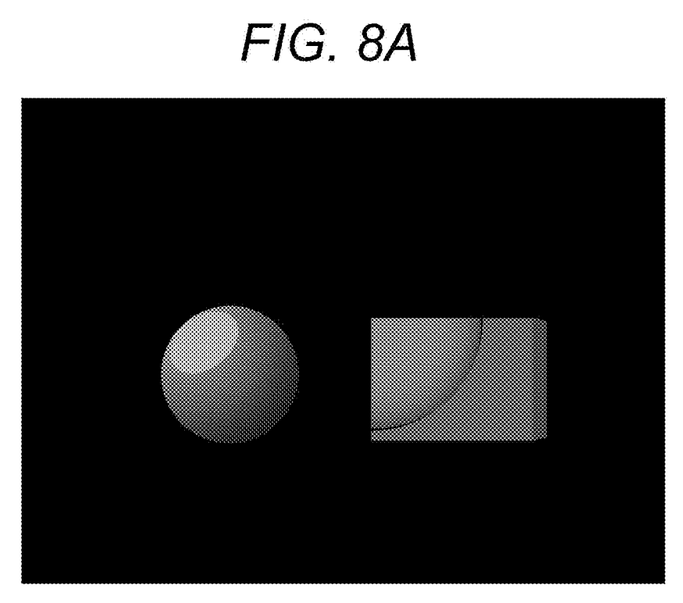
FIGS. 8A and 8B are diagrams each illustrating an output image according to one or more aspects of the present disclosure.
Figure 8B:
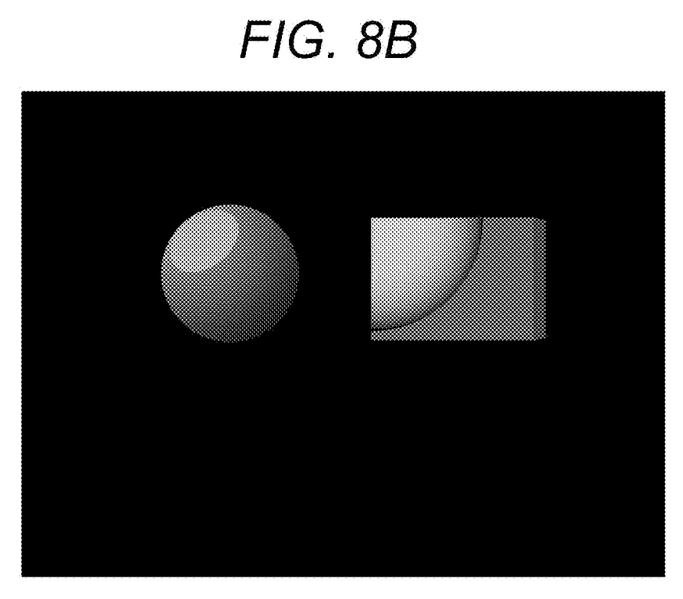

FIG. 8A illustrates an example of the image rendered without performing the emphasizing processing in step S401. FIG. 8B illustrates an example of the output image in the present embodiment. In the output image illustrated in FIG. 8B, unlike in the rendered image illustrated in FIG. 8A, the gloss of the rectangular parallelepiped 501 formed of flat surfaces is emphasized and the texture of the object is more emphasized. The output image data representing the output image obtained by output image generation processing is output to the output device 110 via the output I/F 107. Alternatively, the output image data is recorded on a storage device such as the HDD 104.

According to the present embodiment described above, the gloss of the object can be emphasized in consideration of the shape of the object surface, and thus the image in which the texture of the object is more likely to be perceived can be easily generated.

Modified Examples

Note that in step S302, the shape feature value is calculated for each region obtained by dividing the normal line image, but instead one shape feature value may be obtained from the entire normal line image (without performing region division). A dispersion of the direction of the normal line on the object surface may be directly obtained from the normal line vector of the object surface, without generating the normal line image, and the dispersion thus obtained may be used as the shape feature value. Not only a dispersion of the normal line vector but also a curvature of the object surface may be used as the shape feature value.

Further, in the processing for generating the feature image in step S401, an example in which the specular reflection component is emphasized by Formula (9) has been described above. Alternatively, a gamma curve or an S-curve may be set according to the shape feature value, and the specular reflection component may be emphasized using a tone curve correction based on the curve.

Second Exemplary Embodiment

In the present exemplary embodiment, a degree of dispersion of the intensity of reflected light is used as the shape feature value. The first exemplary embodiment and the present embodiment differ in regard to the method for calculating the shape feature value in step S302 described above. Differences between the first exemplary embodiment and the present exemplary embodiment will be briefly described below.

First, a reference image is generated by performing normal rendering based on the object data and rendering parameter acquired in step S301. Specifically, the intensity I of the reflected light of the mesh included in the angle of view of rendering among the meshes constituting the object is calculated in accordance with Formula (1), and is recorded as the pixel value of the reference image.

Next, in step S302, the degree of dispersion of the intensity of reflected light is calculated as the shape feature value by using the pixel value I(i, j) of the reference image. In the present embodiment, a standard deviation σ of I(i, j) in Formula (14) is used as the degree of dispersion.

$$\sigma = \sqrt{\frac{\sum_{(i,j)\in Img} I(i,j)^2}{num(Img)} - \left\{\frac{\sum_{(i,j)\in Img} I(i,j)}{num(Img)}\right\}^2} \quad \text{Formula (14)}$$

where Img represents the entire reference image, and num(Img) represents the number of pixels of the reference image.

Lastly, in step S303, the degree of emphasis of the gloss is calculated based on the shape feature value σ, and the output image in which the gloss is emphasized according to the degree of emphasis of the gloss is generated. Specifically, the shape feature value F(i, j) in the first exemplary embodiment may be replaced by the shape feature value σ in the present embodiment, and processing similar to that in the first exemplary embodiment may be applied. At this time, the degree of emphasis obtained by Formula (10) is a large value when a fluctuation in the pixel value of the reference image representing the reflected light is small.

According to the second exemplary embodiment described above, the gloss of the object can be emphasized in consideration of the shape of the object based on the intensity of the reflected light of the object. Consequently, it is possible to generate the image in which the texture of the object is more likely to be perceived.

Note that when a plurality of objects is included in the angle of view of rendering, a corresponding image region may be extracted for each object, and the shape feature value may be calculated for each region. In this case, the gloss can be emphasized at different degrees for the respective objects.

Other Exemplary Embodiments

The present disclosure can also be implemented by processing in which a program for implementing one or more functions of the exemplary embodiments described above, which may be stored in one or more memories, may be supplied to a system or an apparatus via a network or a storage medium, and one or more processors in a computer of the system or apparatus can read out the program and execute the program. The present disclosure can also be implemented by a circuit (e.g., ASIC) that implements one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application Nos. 2016-229694, filed Nov. 28, 2016, and 2017-167752, filed Aug. 31, 2017, which are hereby incorporated by reference herein in their entirety.

What is claimed is:

1. An image processing apparatus for generating computer graphics of an object, the apparatus comprising:
at least one processor configured to cause the apparatus to:
acquire shape information indicating a shape of a surface of the object, and reflection characteristic information including parameters of a reflection model of the object, used for calculating a reflection intensity of specular reflected light of the object;
acquire viewpoint information about a viewpoint of viewing the object, and light source information about a light source applying light to the object;
calculate, based on the shape information, a shape feature value related to a degree of flatness of a shape for each predetermined area in the object;
perform an arithmetic operation to emphasize, based on the shape feature value, the reflection intensity of specular reflected light of the object, the reflection intensity being calculated using the shape information, the parameters, the viewpoint information, and the light source information;
generate the image data representing the computer graphics of the object, based on the emphasized reflection intensity of the specular reflected light, the parameters, the viewpoint information, and the light source information; and
output the generated image data.

2. The image processing apparatus according to claim 1, wherein the apparatus emphasizes the reflection intensity of the specular reflected light of the object such that a degree of emphasis increases as a degree of flatness of the shape increases.

3. The image processing apparatus according to claim 2, wherein a case where the degree of flatness of the shape is high is a case where a dispersion of normal lines on the surface of the object is small.

4. The image processing apparatus according to claim 2, wherein a case where the degree of flatness of the shape is high is a case where a dispersion of the light reflection intensity of the object obtained based on the characteristic information, the viewpoint information, the light source information, and the shape information is small.

5. The image processing apparatus according to claim 2, wherein the degree of flatness is a degree of flatness of a plane to which approximation is possible when fine unevenness on the surface of the object is neglected.

6. The image processing apparatus according to claim 2, wherein the degree of flatness indicates greater flatness as a degree of dispersion in a normal line direction of the object decreases when fine unevenness on the surface of the object is neglected.

7. The image processing apparatus according to claim 1, wherein the viewpoint information indicates a position of the viewpoint, a line-of-sight direction from the viewpoint, and a range viewed from the viewpoint.

8. The image processing apparatus according to claim 1, wherein the light source information indicates a position of the light source, a direction of light traveling from the light source, and an intensity of light emitted from the light source.

9. The image processing apparatus according to claim 1, wherein the apparatus emphasizes the reflection intensity of the specular reflected light of the object based on a degree of emphasis for emphasizing the reflection intensity of the specular reflected light proportional to a degree of flatness of the shape indicated by the shape feature value.

10. The image processing apparatus according to claim 1, wherein the apparatus emphasizes an intensity of specular reflected light for each region of the object.

11. The image processing apparatus according to claim 10, wherein the apparatus smoothes a degree of emphasis between regions of the object, and emphasizes the light reflection intensity for each region of the object based on the smoothed degree of emphasis.

12. The image processing apparatus according to claim 1, wherein the apparatus emphasizes the light reflection intensity of the object by performing a tone curve correction based on one of a gamma curve and an S-curve set according to a degree of flatness of the shape.

13. The image processing apparatus according to claim 1, wherein the apparatus calculates, based on the shape information, an emphasis parameter representing a degree of emphasizing the light reflection intensity of the object, and emphasizes the light reflection intensity using the emphasis parameter.

14. The image processing apparatus according to claim 1, wherein, in a case where the surface of the object is not curved, the apparatus emphasizes the light reflection intensity on the surface more than in a case where the surface of the object is curved.

15. The image processing apparatus according to claim 1, wherein, in the outputting, an intensity of ambient light is calculated using the parameters and the light source information,
a reflection intensity of diffused reflected light of the object is calculated using the light source information, the parameters, and the shape information, and
the output image is generated by calculating a sum of the intensity of the ambient light, the reflection intensity of the diffused reflected light, and the emphasized reflection intensity of the specular reflected light.

16. The image processing apparatus according to claim 1, wherein, in the emphasizing, the reflection intensity of the specular reflected light is emphasized by multiplying the reflection intensity of the specular reflected light of the object, the reflection intensity being calculated using the shape information, the parameters, the viewpoint information, and the light source information, by a correction parameter that depends on the shape feature value.

17. An image processing method for generating computer graphics of an object, the method comprising:
acquiring shape information indicating a shape of a surface of the object, and reflection characteristic information including parameters of a reflection model of the object, used for calculating a reflection intensity of specular reflected light of the object;
acquiring viewpoint information about a viewpoint of viewing the object, and light source information about a light source applying light to the object;

calculating, based on the shape information, a shape feature value related to a degree of flatness of a shape for each predetermined area in the object;

performing an arithmetic operation to emphasize, based on the shape feature value, the reflection intensity of specular reflected light of the object, the reflection intensity being calculated using the shape information, the parameters, the viewpoint information, and the light source information;

generating the image data representing the computer graphics of the object, based on the emphasized reflection intensity of the specular reflected light, the parameters, the viewpoint information, and the light source information; and outputting the generated image data.

18. A non-transitory storage medium storing instructions that, when executed by a computer, cause the computer to perform an image processing method for generating computer graphics of an object, the method comprising:

acquiring shape information indicating a shape of a surface of the object, and reflection characteristic information including parameters of a reflection model of the object, used for calculating a reflection intensity of specular reflected light of the object;

acquiring viewpoint information about a viewpoint of viewing the object, and light source information about a light source applying light to the object;

calculating, based on the shape information, a shape feature value related to a degree of flatness of a shape for each predetermined area in the object;

performing an arithmetic operation to emphasize, based on the shape feature value, reflection intensity of specular reflected light of the object, the reflection intensity being calculated using the shape information, the parameters, the viewpoint information, and the light source information;

generating the image data representing the computer graphics of the object, based on the emphasized reflection intensity of the specular reflected light, the parameters, the viewpoint information, and the light source information; and outputting the generated image data.

* * * * *